United States Patent [19]

Yongqing et al.

[11] Patent Number: 5,326,465

[45] Date of Patent: Jul. 5, 1994

[54] PROCESS FOR THE PRODUCTION OF LPG RICH IN OLEFINS AND HIGH QUALITY GASOLINE

[75] Inventors: Huo Yongqing; Wang Zeyu; Wang Yamin; Lu Yukang, all of Beijing, China

[73] Assignees: China Petro-Chemical Corporation; Research Institute of Petroleum Processing, Beijing, China

[21] Appl. No.: 30,578

[22] Filed: Mar. 12, 1993

[30] Foreign Application Priority Data

Oct. 22, 1992 [CN] China ................. 92111450.8

[51] Int. Cl.$^5$ ............ C10G 11/05; C10G 11/18; B01J 29/08
[52] U.S. Cl. .................. 208/120; 208/122; 502/65; 502/67
[58] Field of Search ............ 208/113, 120, 71, 70, 208/122; 502/62, 65, 64, 67; 585/517; 252/455 Z

[56] References Cited

U.S. PATENT DOCUMENTS

| | | | |
|---|---|---|---|
| 3,758,403 | 9/1973 | Rosinski | 502/67 |
| 4,242,237 | 12/1980 | Gladrow et al. | 252/455 Z |
| 4,289,606 | 9/1981 | Gladrow et al. | 208/120 |
| 4,612,298 | 9/1986 | Hettinger et al. | 502/65 |
| 4,658,079 | 4/1987 | Chen | 585/517 |
| 4,716,135 | 12/1987 | Chen | 502/62 |
| 4,810,369 | 3/1989 | Scherzer | 208/120 |
| 4,880,521 | 11/1989 | Scherzer | 208/120 |
| 4,880,787 | 11/1989 | Bundens et al. | 502/65 |

FOREIGN PATENT DOCUMENTS

| | | |
|---|---|---|
| 0020154 | 5/1980 | European Pat. Off. . |
| 0229609 | 1/1987 | European Pat. Off. . |
| 0230005 | 7/1987 | European Pat. Off. . |
| 0256875 | 2/1988 | European Pat. Off. . |

Primary Examiner—R. Bruce Breneman
Assistant Examiner—Bekir L. Yildirim
Attorney, Agent, or Firm—Willian Brinks Hofer Gilson & Lione

[57] ABSTRACT

A process for producing LPG rich in propylene, butylenes and high octane number gasoline by catalytic conversion which comprises contacting the preheated hydrocarbon feedstock with a solid acidic catalyst which contains rare-earth-containing high silica zeolite having the structure of a pentasil (ZRP), rare-earth-Y zeolite (REY) and high silica Y zeolite in a riser or a fluidized bed reactor, at a temperature in the range of from about 480° C. to about 550° C., a pressure in the range of from about 130 KPa to about 350 KPa, a weight hourly space velocity in the range of 1 to 150 hr−1, a catalyst-to-oil ratio in the range of 4 to 15, and a steam-to-feedstock ratio in the range of 0.05 to 0.12:1 by weight.

18 Claims, No Drawings

PROCESS FOR THE PRODUCTION OF LPG RICH IN OLEFINS AND HIGH QUALITY GASOLINE

FIELD OF THE INVENTION

This invention relates to a novel process for the production of high quality gasoline and liquified petroleum gas (LPG) rich in olefins by catalytic conversion of petroleum hydrocarbons, particularly to a process for producing high octane number gasoline with high total yields and LPG rich in propylene and butylene.

DESCRIPTION OF THE PRIOR ART

Conventionally, propylene, butylene and gasoline are produced by catalytic or thermal cracking of petroleum fractions such as Fluid Catalytic Cracking(FCC) or Pyrolysis processes.

Pyrolysis is aimed at producing ethylene. The gasoline fraction of the product is rich in aromatics and di-olefins with poor quality. Due to its high temperature (beyond 700° C.) cracking, it needs more expensive material for reactor fabrication. Besides, it also needs purification and sophisticated separation of geseous products.

Catalytic cracking can be operated at a temperature much lower than that of pyrolysis, and can produce also low carbon olefins. As an example, in DD152,356 50wt% of $C_2 \sim C_4$ olefins are obtained by employing gasoline or vacuum gas oil as feedstock, amorphous silica-alumina as catalyst, in a fixed bed or a moving bed reactor, at reaction temperature of 600°~800° C. and contact time of 0.1~1.5 seconds. In Japanese Laid-open application 60-222,428, $C_5 \sim C_{25}$ paraffinic hydrocarbons or naphtha is used as feedstock, ZSM-5 zeolite as the catalyst, under 600°~700° C. reaction temperature, and LHSV of 20~300hr$^{-1}$, around 30 wt% of $C_2 \sim C_4$ olefins can be obtained. More examples are described in U.S. Pat. No. 4,980,053 and CN1004878B, which various boiling range of petroleum fractions, residual oil or crude oil are used as feedstocks. A composite of ZSM-5 and rare earth type Y(REY) or ZSM-5 and ultrastable type Y(USY) zeolites are used as catalysts. Using a fluidized bed or moving bed reactor, under 500°~600° C., $1.5 \sim 3.0 \times 10^5$Pa, weight hourly space velocity(WHSV) of 0.2~2.0h$^{-1}$ and catalyst/oil ratio of 2~12, a total yield of propylene plus butylenes can reach about 40 wt%.

Conventional FCC process can produce up to 50 wt% or more gasoline, but the LPG yield is not more than 8~13 wt%, in which propylene plus butylene is less than 10% by weight. Moreover, the gasoline octane number can not usually meet the requirement for blending gasoline commodity. For more than ten years, patent literatures reveals that using ZSM-5 additives in combination with catalytic cracking catalyst can enhance a cracking gasoline octane number and increase a yield of alkylates. As described in U.S. Pat. No. 4,368,114, Joliet sour heavy gas oil(boiling range of 212°~513° C.) was used as feedstock The catalyst composition comprises a mixture of 25% ZSM-5 zeolite-containing additive was added to Super D cracking catalyst(products of Grace-Davison, its composition: 17% RENaY/Clay.SiO$_2$). When the mixture contains 0.1~0.5 wt% ZSM-5 zeolite in Super D, at the reaction temperature 574° C., WHSV 20hr$^{-1}$, and catalyst/oil ratio 3, the yield of the obtained $C_5^+$ gasoline is 47~53.7 vol% with research octane number(RONC) of 90.1~91.4, and the LPG yield was 30.4~37.1 vol.% in which the yield of propylene plus butylenes are 15.2~19.6 vol.%. In U.S. Pat. No. 4,522,705, the feedstock is also Joliet sour heavy gas oil as mentioned above. The catalyst is a mixture of HEZ-53 cracking catalyst(product of Engelhard, contains Y zeolite) and a ZSM-5 zeolite-containing additive, the mixture contains 0.25~2.0 wt% of ZSM-5 zeolite. The reactions are carried out under 515° C., WHSV 15.5 hr$^{-1}$, yield of $C_5^+$ gasoline is 39.5~46.6 vol.% with RONC of 90.1~92.0, and propylene plus butylenes are 15.1~24.2 vol.%. In U.S. Pat. No. 4,818,738, the feedstock is also the same as described hereinbefore. The catalyst is a mixture of REY cracking catalyst and a ZSM-5 zeolite-containing additive, in which it contains 25% of ZSM-5 zeolite, the mixture was prepared in a ratio of additive to REY cracking catalyst of 1:50 by weight. Under the conventional operating conditions of FCC process, the $C_5^+$ gasoline yield is 47.5 vol.% with RONC of 90.8, and $iC_4 + C_3^= + C_4^=$ s yield is 23.9 vol.%. In EP 229,609, a gas oil with a boiling range of 204~538° C. is used as the feedstock. The catalyst is a mixture of a ZSM-5 zeolite-containing additive and Octacat cracking catalyst(active component: 40% of USY, matrix: kaolin clay and silica-alumina sol binder), in which it contains 1.25~1.5 wt% of ZSM-5 zeolite. Under reaction temperature of 493°~498° C. $C_5^+$ gasoline is 53.1~55.4 vol.% with RONC of 92.6~93.0, LPG 19.6~21.4 vol.%, and propylene plus butylenes 14.8~14.9 vol.%.

By adding ZSM-5 additives into FCC catalyst, not only enhances the product gasoline octane number, but also increases the yield of propylene and butylenes in LPG. AS described in U.S. Pat. No. 3,758,403, by adding ZSM-5 additive into a cracking catalyst that contains zeolite which has the pore size larger than 7 angstoms to enhance both the gasoline octane number and propylene plus butylenes yield, when the REY cracking catalyst contains 5~10% of HZSM-5, a gas oil with boiling range of 204°-316° C. is processed at 482°~486° C., LHSV of 4 hr$^{-1}$ and catalyst/oil ratio of 1.5, to obtain the mixture of $C_5^+$ gasoline plus alkylates with the RON(+3 ml TEL) being 97.3~98.6, while the $C_5^+$ gasoline yield is in the range of 46.4~55.3 vol.%, the propylene plus butylenes is 19.8~24.7 vol.%.

The object of this invention is to provide a process using a composite catalyst which contains three kinds of zeolites to catalytically convert feedstocks of the petroleum fractions with different boiling range, resids or crude oils to LPG rich in propylene and butylenes, and high yield and quality of $C_5^+$ gasoline.

Further objects of this invention will become apparent by reading the following description and the attached claims.

SUMMARY OF THE INVENTION

This invention provides a novel process for the production of LPG rich in $C_3^=$, $C_4^=$'s and high octane number gasoline by catalytically converting hydrocarbons. It comprises contacting the preheated hydrocarbon feedstock converted in a riser or a fluidized bed reactor with a solid asidic catalyst which contains rare-earth-containing high silica zeolite having the structure of a pentasil (hereinafter referred to as ZRP),REY zeolite and high-silica Y zeolite, and then converting the above materials in the reactor under 480°~550° C. 130~350 KPa, WHSV of 1~150hr$^{-1}$, catalyst to oil ratio of 4~15, steam to hydrocarbon feedstock ratio of 0.05~0.12:1 by weight. The spent catalyst after reaction is stripped, and then conducted to a regenerator where the spent catalyst is regenerated by contacting with air. The regenerated catalyst flows back to the reactor and then the regenerator, and reuse circulatively.

DETAILED DESCRIPTION OF THE INVENTION (1) Catalyst

Catalyst according to this invention is revealed in another U.S. patent application "A hydrocarbon conversion catalyst for producing high quality gasoline and $C_3$ and $C_4$ olefins" submitted by the same applicant at the same time. The catalyst contains 10~40 wt% of three kinds of zeolites ZRP, REY and high silica Y as active components, and the rest part is the matrix which is either full silica-alumina synthetic or semi-synthetic that contains natural kaolin or halloysite with 10–40 wt%(based on catalyst) silica and/or alumina as the binders. In total amount of active components, zeolites ZRP, REY and high silica Y are 3~50, 12~75 and 12~75 wt% respectively.

Said ZRP zeolite is a rare-earth-containing high silica zeolite having the structure of a petasil as revealed in US series number 07/820,385 (1992.1.14) or European application series number 92200061.7 (1992.1. 10) by the same applicant. The chemical formula of ZRP (based on the moles of oxides)can be expressed as:$0.01\sim0.30RE_2O_3 . 0.4\sim1.0Na_2O . Al_2O_3 . 20\sim60SiO_2$ in its anhydrous state, its XRD data are listed in Table 1. The ratio of adsorption of normal-hexane to cyclohexane of ZRP is 2~4 times of that of HZSM-5, hence its pore size is smaller than that of ZSM-5. The rare earth ingredient of the zeolite originates from a rare earth containing faujasite used as seed in the synthecis of ZRP zeolite. In this invention, it is preferably to use H-form ZRP, with crystallite size of 2-3 microns.

Said REY zeolite is prepared by exchanging NaY with

TABLE 1

| X-ray diffraction patterns of zeolite ZRP | | | |
|---|---|---|---|
| ZRP | | H-ZRP* | |
| d(Å) | 100 $I/I_o$ | d(Å) | 100 $I/I_o$ |
| 11.17 | 40 | 11.18 | 37 |
| 10.01 | 35 | 10.01 | 40 |
| 9.76 | 12 | 9.75 | 10 |
| 7.45 | 4 | 7.44 | 3 |
| 7.08 | 1.5 | 7.09 | 1.5 |
| 6.71 | 6 | 6.72 | 3.5 |
| 6.37 | 8 | 6.37 | 7 |
| 6.01 | 11 | 6.00 | 11 |
| 5.72 | 10 | 5.71 | 8 |
| 5.58 | 10 | 5.58 | 9 |
| 5.37 | 3 | 5.38 | 2 |
| 5.15 | 3 | 5.14 | 3 |
| 5.04 | 5 | 5.05 | 5 |
| 4.985 | 8 | 4.983 | 8 |
| 4.621 | 6 | 4.620 | 6 |
| 4.366 | 10 | 4.369 | 7 |
| 4.267 | 13 | 4.265 | 12 |
| 4.090 | 5 | 4.085 | 2 |
| 4.010 | 9 | 4.010 | 7 |
| 3.861 | 100 | 3.856 | 100 |
| 3.819 | 74 | 3.817 | 72 |
| 3.755 | 41 | 3.752 | 36 |
| 3.720 | 49 | 3.719 | 39 |
| 3.650 | 28 | 3.652 | 26 |
| 3.591 | 7 | 3.593 | 4 |
| 3.481 | 9 | 3.479 | 6 |
| 3.447 | 13 | 3.447 | 11 |

*H-ZRP hydrogen-exchanged form rare earth cation, followed by calcination or without calcination. The rare-earth content of the product is 5~19% as $RE_2O_3$, crystallite size is 0.5~10 microns, preferably 0.8~2 microns.

Said high silica Y zeolite can be prepared by various chemical and/or physico-chemical methods, such as hydrothermal processing, acid extraction, framework dealumination and enrichment with silica, $SiCl_4$ treatment, etc., to obtain a stablized product of zeolite Y, in which the $Na_2O$ content should not exceed 4 wt%, preferably less than 1 wt%, unit cell size of the crystal should not exceed 24.5 angstrons, the silica/alumina ratio(molar) lies in the range of 8~15 or more, the crystallite size 0.5~10 microns, preferably 0.8~2 microns.

Said synthetic matrix is an amorphous silica/alumina or silica/magnesia gel containing $SiO_2$ not more than 70 wt% which is prepared by cogellation or step-wise precipitation. To increase the catalyst bulk density, appropriate amounts of clay can be blended with the synthetic matrix composite.

Said semi-synthetic matrix is a composite of clay and binder. Clays such as kaolin or halloysite are conventionally used as matrices of cracking catalysts, and binders such as alumina, silica or silica-alumina in their sol or gel states are used.

(2) The Feedstock

The hydrocarbon feedstocks used in this invention can be petroleum fractions of different boiling range, resids or crude oils. Particularly, they can be straight run fractions including naphtha, light gas oil, vacuum gas oil and resids, etc; mixture of two or more of the above-mentioned materials in any desirable proportion; above-mentioned materials blending with some amount of, preferably no more than 30wt%, coker gas oil, deasphalted oil or other secondary processed fractions.

As the catalyst of this invention can tolerate high nickel content in the feedstock, resids with nickel content up to 15 ppm and heavy oils blending with processed fractions can also be processed.

(3) Process and Operating Conditions

The novel process of this invention is described hereinbelow. Preheated hydrocarbon feed contacts with a solid acidic catalyst which contains ZRP, REY and high silica Y zeolite in a riser or a fluidized bed reactor. Catalytic conversion was carried out under temperatures of 480°~550° C., preferably 500°~535° C.; reaction pressure 130~350 KPa, preferably 130~250 KPa; WHSV of 1~150 hr$^{-1}$, preferably 3~80 hr$^{-1}$; catalyst to oil ratio of 4~15, preferably 5~10. To ensure the effective atomization of the feed, steam or other gases may be injected into and mixed with the feed at a steam to feed hydrocarbon ratio of 0.05~0.12:1 by weight. The converted products mixed with coke deposited spent catalyst are seperated from each other while it passes through a series of cyclones. The spent catalyst then passes through a stripper where the adsorbed hydrocarbons are stripped off, and then conducted to the regenerator. In the regenerator, coke deposited on spent catalyst is burnt off by contacting with air in the regenerator under temperature of 580°~730° C., preferably 650°~700° C. Regenerated hot catalyst comes back to the reactor where it contacts with hydrocarbon feed and then reaction and regeneration takes place repeatedly. Passing through fractionators and adsorption-stabilization system, the products are seperated into $H_2$~$C_2$, LPG, gasoline, light cycle oil and heavy bottom oil. The heavy bottoms or both heavy bottoms and light cycle oil can be converted by recycling back to the reactor.

In this process, the catalyst in an equilibrium state allows 20,000 ppm of nickel or higher.

The operating conditions described hereinabove are for general cases. They can be adjusted as conforming to the feedstock characteristics and expected products yield distribution.

The novel process of this invention is applicable either to a specially designed unit that is similar to conventional FCC unit or by modifying or revamping an existing FCC unit(such as enlargement of LPG seperators, condensers and compressors capacity etc.).

The process provided by this invention can produce high yields of LPG rich in propylene and butylenes, meanwhile produce high yield of gasoline which has enhanced antiknocking ability and stability; and also produce diesel fraction, its quality is compatible to that produced by conventional fluid catalytic cracking process. Riser pilot plant results show the yields(based on feed) as follows: LPG 30~40 wt%, in which 67~75 parts by weight are propylene and butylenes (i.e. total yield of propylene plus butylenes amounted to 20~30 wt%); $C_5^+$ gasoline yields 45~55 wt% with RONC of 91~95, motor octane number(MONC) of 80~84, induction period of 500~1000 minutes and existent gum of 0~3 mg/100 ml. LPG plus total liquid products are high up to 90 wt%. LPG to $H_2$~$C_2$ ratio on weight basis is up to 8~13:1.

The examples given below illustrate further the novel catalytic conversion process provided by this invention, but by no means to limit the scope of this invention.

Feedstock properties relating to the following examples are listed in Table 2.

Catalyst A used in the examples was prepared as follows:

1200 grams of alumina hydrogel($Al_2O_3$ 20 wt%) were mixed thoroughly with 950 grams of halloysite clay(solid content 80wt%) as the matrix slurry. In addition, 71 grams of H-ZRP zeolite(prepared according to the procedures of Example 8 described in US series number 07/820,385 or European series number 92200061.7), 214 grams of REY and 143 grams of DASY zeolite(a high-silica Y zeolite prepared by hydrothermal dealumination method, $SiO_2/Al_2O_3$=8~9) were blended with 514 grams of decationized water to obtain a homogenized slurry. The two slurries described above were mixed, homogenized and spary dried, then washed and flash dryed.

Example 1

The process provided by this invention was suitable for conversion of gas oil from a variety of crude oils or mixture of gas oils and other processed fractions.

Catalytic conversion was conducted on a bench scale fluidized-fixed bed unit, using catalyst A, with feedstocks of various hydrocarbons listed in Table 3 at 515° C., 130 KPa, WHSV 14 $hr^{-1}$, catalyst/oil ratio at 8 and steam to feed hydrocarbon ratio 0.07:1 by weight. The results were listed in Table 3.

TABLE 3

| Feed | A | B | D | G |
|---|---|---|---|---|
| Product Distribution, wt % | | | | |
| $H_2$~$C_2$ | 2.45 | 2.65 | 2.76 | 2.86 |
| LPG | 32.43 | 22.82 | 22.50 | 29.05 |
| $C_3$= | 10.30 | 7.15 | 6.55 | 8.02 |
| $C_4$= | 7.87 | 5.55 | 5.19 | 7.12 |
| Gasoline ($C_5^+$~205° C.) | 46.99 | 48.43 | 46.68 | 42.89 |
| 205~330° C. | 9.16 | 13.34 | 14.74 | 10.85 |
| >330° C. | 4.62 | 7.41 | 6.98 | 5.93 |
| Coke | 5.35 | 5.35 | 6.34 | 8.42 |
| Conversion, wt % | 86.22 | 79.25 | 78.28 | 83.22 |

Example 2

The process provided by this invention was suitable for catalytic conversion of various petroleum fractions and crude oils.

Catalytic conversion, using catalyst A contaminated with 3600 ppm of nickel and feedstocks of various kinds of hydrocarbons was carried out on a fluidized fixed-bed bench scale unit at the same operating conditions as described in Example 1. Results were listed in Table 4. The straight run gasoline in Table 4 was the fraction with boiling point below 200° C. and the light gas oil with the boiling range from 200° to 330° C.

The catalyst was artificially contaminated by nickel. The procedures are described as follows:

With catalyst to nickel naphthenate (7.8% of nickel) ratio of 50:2.564 by weight, firstly dissolved 2.564 kilograms of nickel naphthenate into 50 liters of light gas oil. The mixture was pumped into the feeding system at a constant rate for 24 hours, therein contact and react with 50 kilograms of catalyst in the riser reactor. Nickel deposition takes place on the catalyst. Then replaced the mixture by pure feed hydrocarbons was contacted with the catalyst under the same conditions as mentioned above for another 24 hours. Thus, catalyst contaminated with 3600 ppm of nickel was prepared.

TABLE 2

| Feed | A | B | C | D | E | F | G | H* |
|---|---|---|---|---|---|---|---|---|
| Density (20° C.), g/cm³ | 0.8560 | 0.8871 | 0.8572 | 0.8995 | 0.8672 | 0.8612 | 0.8810 | 0.7893 |
| Conradson Carbon, wt % | 0.22 | 0.22 | 0.17 | 0.22 | 3.81 | 2.12 | 0.24 | 0.23 |
| UOP K | 12.11 | 12.0 | 12.1 | 11.7 | 11.9 | 12.6 | — | — |
| H, wt % | 13.24 | — | 13.57 | 11.70 | — | 13.94 | 12.82 | — |
| C, wt % | 86.52 | — | 85.92 | 85.95 | — | 85.76 | 86.45 | — |
| Basic Netrogen, ppm | 420 | — | 357 | 693 | — | 600 | 576 | 201 |
| Ni, ppm | 0.49 | — | 0.1 | 3.6 | 11.3 | 3.3 | 0.3 | 1.6 |
| V, ppm | 0.03 | — | <0.1 | <0.1 | 0.1 | <0.1 | 0.5 | <0.1 |
| Boiling Range, °C. | 319~504 | 243~507 | 243~490 | 224~482 | >308 | >291 | 286~534 | — |

*Paraffinic base crude oil

TABLE 4

| Feed | Straight Run Gasoline | Straight Run Light Gas Oil | F | E | H |
|---|---|---|---|---|---|
| Product Distribution, wt % | | | | | |
| $H_2 \sim C_2$ | 1.74 | 2.55 | 2.45 | 2.45 | 3.17 |
| LPG | 29.37 | 30.96 | 29.90 | 27.78 | 28.63 |
| $C_3=$ | 6.76 | 7.09 | 9.32 | 9.00 | 8.20 |
| $C_4=$ | 5.39 | 5.92 | 7.43 | 9.73 | 6.42 |
| Gasoline ($C_5^+ \sim 205°$ C.) | 61.44 | 38.05 | 46.52 | 45.26 | 42.34 |
| 205~330° C. | 3.29 | 19.32 | 9.56 | 8.56 | 10.75 |
| >330° C. | 0.00 | | 3.84 | 4.45 | 4.80 |
| Coke | 4.16 | 9.12 | 7.73 | 11.50 | 10.31 |
| Conversion, wt % | 96.71 | 80.68 | 86.60 | 86.99 | 84.45 |

Example 3

The process provided by this invention was suitable for catalytic conversion of high nickel content hydrocarbon feeds.

Catalytic conversion, using catalyst A, without or with contamination of 3600 ppm of nickel, was carried out on a riser pilot plant test unit under pressure of 199 KPa and catalyst to oil ratio of 8. Feed E and F with nickel content of 11.3 ppm and 3.3 ppm respectively were used in this example. Results were listed in Table 5.

TABLE 5

| Feed | F | F | E |
|---|---|---|---|
| Ni on Catalyst A, ppm | 0 | 3600 | 3600 |
| Reaction Temp., °C. | 515 | 514 | 515 |
| WHSV, hr[1] | 73 | 74 | 74 |
| Steam/Feed (wt/wt) | 0.101 | 0.099 | 0.100 |
| Product Distribution, wt % | | | |
| $H_2 \sim C_2$ | 3.27 | 2.86 | 2.86 |
| LPG | 35.60 | 33.91 | 31.91 |
| $C_3=$ | 11.41 | 11.17 | 10.92 |
| $C_4=$ | 13.94 | 13.51 | 17.93 |
| $C_5^+$ Gasoline | 44.18 | 44.52 | 43.99 |
| 205~330° C. | 0.35 | 1.92 | 2.27 |
| Coke | 6.05 | 6.34 | 9.51 |
| Conversion, wt % | 89.10 | 87.63 | 88.27 |

Example 4

For the process provided by this invention, the product distribution could be adjusted by changing the operating conditions.

Catalytic conversion, using catalyst A contaminated with 3600 ppm nickel and feed F, was carried out on riser pilot plant test unit mentioned in Example 3 under pressure of 199 KPa and catalyst/oil ratio of 8. The results were listed in Table 6.

TABLE 6

| Reaction Temp., °C. | 500 | 514 | 529 |
|---|---|---|---|
| WHSV, hr[1] | 78 | 74 | 71 |
| Steam/Feed (wt/wt) | 0.103 | 0.099 | 0.104 |
| Product Distribution, wt % | | | |
| $H_2 \sim C_2$ | 2.25 | 2.86 | 4.49 |
| LPG | 31.69 | 33.91 | 36.87 |
| $C_3=$ | 91.72 | 11.17 | 13.47 |
| $C_4=$ | 13.10 | 14.51 | 15.18 |
| $C_5^+$ Gasoline | 44.85 | 44.52 | 41.24 |
| >200° C. | 16.06 | 12.37 | 11.95 |
| Coke | 5.15 | 5.34 | 5.45 |
| Conversion, wt % | 83.94 | 87.63 | 88.05 |

Example 5

The process provided by this invention was suitable for various moods of operation.

Catalytic conversion, using catalyst A contaminated with 3600 ppm nickel and feed F, was carried out on a riser pilot plant test unit mentioned in Example 3 at 515° C., 130 KPa and catalyst/oil ratio of 8. The results were listed in Table 7.

TABLE 7

| Operrating Mood | Once-Through | Bottoms Recycle | Bottoms + LCO Recycle |
|---|---|---|---|
| WHSV, hr[1] | 73 | 74 | 76 |
| Steam/Feed (wt/wt) | 0.101 | 0.105 | 0.102 |
| Product Distribution, wt % | | | |
| $H_2 \sim C_2$ | 2.86 | 3.17 | 3.65 |
| LPG | 33.91 | 33.70 | 34.91 |
| $C_3=$ | 11.17 | 11.20 | 11.41 |
| $C_4=$ | 13.95 | 13.63 | 14.22 |
| 205~330° C. | 10.41 | 11.05 | — |
| >330° C. | 1.63 | — | — |
| Coke | 6.34 | 6.74 | 7.47 |
| Conversion, wt % | 87.96 | 88.95 | 100.00 |

Example 6

The process provided by this invention cloud produce high yields of LPG, and gasoline with good antiknocking ability and stability.

Catalytic conversion, using catalyst A contaminated with 3600 ppm nickel and various kinds of feed, was carried out on a riser pilot plant as mentioned in Example 3 and also in a fluidized-fixed bed bench scale unit as mentioned in Example 1 at catalyst/oil ratio of 8, different reaction temperatures and various operating moods. The results were listed in Table 8.

Example 7

For the novel process provided by this invention, the LPG product was rich in propylene, normal-butylenes and iso-butylenes.

Catalytic conversion, using catalyst A contaminated with 3600 ppm nickel and the feed F, was carried out on a

TABLE 8

| Test Unit | Riser Pilot Plant | | | | Fixed-Fluided Bed Bench Scale | | |
|---|---|---|---|---|---|---|---|
| Feed | F | | | | A | C | B |
| Operating Mood | Bottoms Recycle | Bottoms + LCO Recycle | Once-Through | Once-Through | Once-Through | Once-Through | Once-Through |
| Reaction Temp., °C. | 500 | 500 | 515 | 530 | 515 | 530 | 515 |
| Product Distribution, wt % | | | | | | | |
| LPG | 29.8 | 32.1 | 35.6 | 36.9 | 32.45 | 29.4 | 22.3 |

TABLE 8-continued

| Test Unit | Riser Pilot Plant | | | | Fixed-Fluided Bed Bench Scale | | |
|---|---|---|---|---|---|---|---|
| Feed | F | | | | A | C | B |
| Operating Mood | Bottoms Recycle | Bottoms + LCO Recycle | Once-Through | Once-Through | Once-Through | Once-Through | Once-Through |
| Gasoline | 45.9 | 54.1 | 44.2 | 41.2 | 47.0 | 46.1 | 48.2 |
| Gasoline Properties | | | | | | | |
| RON(C) | 92.6 | 91.4 | 94.2 | 93.0 | 92.7 | 95.1 | 93.9 |
| MON(C) | 80.9 | 80.7 | 81.6 | 81.2 | 81.2 | 82.6 | 82.5 |
| Induction Period, min | 825 | 1110 | 735 | 525 | | | |
| Existent Gum, mg/100 ml | 2 | 2 | 0 | 2 | | | | riser pilot plant as mentioned in Example 3 under the pressure of 199 KPa and catalyst/oil ratio of 8. The results were listed in Table 9.

TABLE 9

| Reaction Temp., °C. | 500 | 515 | 530 | 500 |
|---|---|---|---|---|
| WHSV, hr$^{-1}$ | 63 | 84 | 81 | 84 |
| Steam/Feed (wt/wt) | 0.108 | 0.099 | 0.104 | 0.105 |
| Operating Mood | Once-Through | Once-Through | Once-Through | Bottoms Recycle |
| $C_3^=$ yield, wt % | 9.72 | 11.17 | 13.47 | 9.83 |
| $C_3^=$/LPG, wt % | 30.70 | 32.94 | 36.53 | 32.18 |
| $C_3^=/(C_3^* + C_3^=)$, wt % | 86.4 | 86.1 | 88.4 | 84.7 |
| Total $C_4^=$ yield, wt % | 12.34 | 12.90 | 14.51 | 11.36 |
| $iC_4^=$ yield, wt % | 3.93 | 4.67 | 4.73 | 4.35 |
| $C_4^=$/LPG, wt % | 41.33 | 39.84 | 41.17 | 38.40 |
| $C_4^=/(C_4^* + C_4^=)$, wt % | 64.50 | 65.30 | 70.81 | 62.41 |

Example 8

Low yield of dry gas was produced by the process provided by this invention.

Catalytic conversion, using catalyst A contaminated with 3600 ppm nickel and the feed F, was carried out on a riser pilot plant as mentioned in Example 3 under the pressure of 199 KPa and catalyst/oil ratio of 8. The results are listed in Table 10.

TABLE 10

| Reaction Temp., °C. | 500 | 514 | 529 | 500 | 515 |
|---|---|---|---|---|---|
| WHSV, hr$^1$ | 78 | 84 | 81 | 87 | 86 |
| Steam/Feed (wt/wt) | 0.103 | 0.099 | 0.104 | 0.101 | 0.102 |
| Operating Mood | Once-Through | Once-Through | Once-Through | Bottoms + LCO Recycle | Bottoms + LCO Recycle |
| Product Distribution, wt % | | | | | |
| $H_2 \sim C_2$ | 2.25 | 2.86 | 4.49 | 3.55 | 3.65 |
| LPG | 1.69 | 33.91 | 36.87 | 32.69 | 34.91 |
| Gasoline | 44.85 | 44.52 | 41.24 | 53.84 | 53.97 |
| LPG/$H_2 \sim C_2$ | 14.1 | 11.9 | 8.2 | 9.2 | 9.6 |

Example 9

The process provided by this invention produced lower yields of dry gas and coke, higher yields of LPG, propylene and butylenes, and the product gasoline with improved properties as compared with conventional catalytic cracking process which used additives.

For comparesion of the two processes, both catalytic cracking and catalytic conversion referred to by this invention were carried out on the riser pilot plant test unit as mentioned in Example 3 and using feed E. The difference was, that in catalytic cracking, the conventional cracking catalyst LWC-33 blended with additive B was used, while in catalytic conversion, catalyst A was used. The proportion of ZRP in catalyst A was the same as that of ZSM-5 in the mixture of LWC-33 and additive B. The results were listed in Table 11.

Additive B mentioned hereinabove in this example was a composite of HZSM-5, pseudo-Boehmite and halloysite and was prepared by the same procedures of conventional semi-synthetic cracking catalyst through slurrying, mixing, homogenizing, spray drying, etc. The composition could be expressed as: 20% HZSM-5/15% $Al_2O_3$/65% by weight Halloysite.

LWC-33 is a conventional commercial REY catalyst produced by Lan Zhou Refinery.

TABLE 11

| Catalyst | A | LWC-33 + B | |
|---|---|---|---|
| Reaction Temp., °C. | 500 | 500 | 520 |
| Product Distribution, wt % | | | |
| $H_2 \sim C_2$ | 2.77 | 3.00 | 3.61 |
| LPG | 30.52 | 20.40 | 21.49 |
| $C_3^=$ | 9.80 | 6.91 | 7.11 |
| $C_4^=$ | 11.85 | 8.42 | 9.61 |
| Gasoline ($C_5^+ \sim 205°$ C.) | 45.05 | 47.40 | 48.00 |
| $205 \sim 330°$ C. | 13.14 | 18.30 | 16.80 |
| $>330°$ C. | — | — | — |
| Coke | 8.52 | 10.90 | 10.10 |
| Loss | 1.00 | — | — |
| Conversion, wt % | 86.86 | 81.70 | 83.20 |
| Gasoline's RON(C) | 92.8 | — | — |
| MON(C) | 81.5 | 77.6 | 79.3 |
| Induction Period, min | 825 | 485 | 421 |

What is claimed is:

1. A process for producing LPG rich in propylene, butylenes and high octane number gasoline by catalytic conversion which comprises:

(1) contacting in a riser or a fluidized bed reactor a preheated hydrocarbon feedstock with a solid acidic catalyst which contains three zeolitic active components including rare-earth-containing high silica zeolite having the structure of a pentasil (ZRP), rare-earth-Y zeolite (REY) and high silica Y zeolite, and (2) converting said feedstock in the reactor at a temperature in the range of from about 480° C. to about 550° C., a pressure in the range of from about 130 KPa to about 350 KPa, a weight hourly space velocity in the range of 1 to 150 hr−1, and a catalyst-to-oil ratio in the range of 4 to 15.

2. The process of claim 1, wherein said catalytic conversion is carried out at a temperature in the range of from 500° C. to 535° C., a pressure in the range of from 130 KPa to 250 KPa, a weight hourly space velocity in the range of 3 to 80 hr−1, and a catalyst-to-oil ratio in the range of 5 to 10.

3. The process of claim 1, wherein said three zeolitic active components comprise 10 to 40 wt% of said catalyst, and the remainder of said catalyst comprises a matrix containing silica or silica/alumina binders.

4. The process of claim 3, wherein the said matrix is an amorphous silica/alumina or silica/magnesia gel containing not more than 70 wt% $SiO_2$.

5. The process of claim 1, wherein said ZRP zeolite is characterized by having:

A. the following anhydrous state formula 0.01–0.30 $RE_2O_3$ . 0.4–1.0 $Na_2O$ . $Al_2O_3$ . 20–60 $SiO_2$, B. X-ray diffraction patterns as follows:

| d(Å) | 100 I/I$_o$ |
|---|---|
| 11.17 | 40 |
| 10.01 | 35 |
| 9.76 | 12 |
| 7.45 | 4 |
| 7.08 | 1.5 |
| 6.71 | 6 |
| 6.37 | 8 |
| 6.01 | 11 |
| 5.72 | 10 |
| 5.58 | 10 |
| 5.37 | 3 |
| 5.15 | 3 |
| 5.04 | 5 |
| 4.985 | 8 |
| 4.621 | 6 |
| 4.366 | 10 |
| 4.267 | 13 |
| 4.090 | 5 |
| 4.010 | 9 |
| 3.861 | 100 |
| 3.819 | 74 |
| 3.755 | 41 |
| 3.720 | 49 |
| 3.650 | 28 |
| 3.591 | 7 |
| 3.481 | 29 |
| 3.447 | 13 | and c. a 2–4 times higher ratio of adsorption capacity for normal-hexane to cyclohexane than HZSM-5.

6. The process of claim 1, wherein said ZRP zeolite is in hydrogen-exchanged form.

7. The process of claim 1, wherein said hydrocarbon feedstocks are straight run fractions, including naphtha, light gas oil, vacuum gas oil and resids; or mixtures of two or more of the above fractions mixed in any desirable proportions.

8. The process of claim 7, wherein said resid feeds are heavy hydrocarbons with high nickel content.

9. The process of claim 7, where said straight run fractions are blended with coker gas oil, deasphalted oil, other secondary processed fractions, or mixtures thereof, or crude oils.

10. The process of claim 9, wherein said coker gas oil, deasphalted oil, other secondary processed fractions, or mixtures thereof, blended with said straight run fractions make up not more than 30 wt% of said feed.

11. The process of claim 1, wherein said catalyst in an equilibrium state allows 20,000 ppm of Nickel equivalent or higher.

12. The process of claim 1, wherein the bottoms or the bottoms together with the light cycle oil fraction in the products are recycled to the reactor to be reconverted.

13. The process of claim 1, which further comprises stripping and regenerating the catalyst after the catalytic conversion and returning the stripped and regenerated catalyst to the reactor for reuse.

14. The process of claim 1, wherein a gas is added to said feedstock to promote atomization of said feedstock.

15. The process of claim 14, wherein said gas is steam which is added to said feedstock at a steam-to-feedstock ratio between 0.05–0.12:1 by weight.

16. The process of claim 1, wherein 5–19% of said REY zeolite is in the form of $RE_2O_3$, and the crystallite size of said REY zeolite is 0.5–10 microns.

17. The process of claim 1, wherein the $Na_2O$ content of said high silica Y zeolite does not exceed 4 wt%, and the crystallite size of said high silica Y zeolite is 0.5–10 microns.

18. A process for producing LPG rich in propylene, butylenes and high octane number gasoline by catalytic conversion which comprises:

(1) contacting in a riser or a fluidized bed reactor a preheated hydrocarbon feedstock with a solid acidic catalyst which contains a matrix and three zeolithic active components including rare-earth-containing high silica zeolite having the structure of a pentasil (ZRP), rare-earth-Y zeolite (REY) and high silica Y zeolite, and (2) converting said feedstock in the reactor at a temperature in the range of from about 480° C. to about 550° C., a pressure in the ranger of from about 130 KPa to about 350 KPa, a weight hourly space velocity in the range of 1 to 150 hr−1, a catalyst-to-oil ratio in the range of 4 to 15, and a steam-to-feedstock ratio between 0.05–0.12:1 by weight;

wherein said catalyst is characterized as follows:

(1) the anhydrous state formula of said ZRP zeolite is 0.01–0.30 $RE_2O_3$ . 0.1–1.0 $Na_2O$ . $Al_2O_3$ . 20–60 $SiO_2$;

(2) said ZRP zeolite is in hydrogen-exchanged form;

(3) 5–19% of said REY zeolite is in the form of $RE_2O_3$, and the crystallite size of said REY zeolite is 0.5–10 microns.

(4) the $Na_2O$ content of said high silica Y zeolite does not exceed 4 wt%, and the crystallite size of said high silica Y zeolite is 0.5–10 microns; and (5) said matrix is an amorphous silica/alumina or silica/magnesia gel containing not more than 70 wt% $SiO_2$.

* * * * *